United States Patent
Kasar et al.

(10) Patent No.: US 11,320,659 B1
(45) Date of Patent: May 3, 2022

(54) HEADBAND FOR HEAD-MOUNTED DEVICE WITH MAGNETIC COMPONENTS

(71) Applicants: Darshan R. Kasar, San Francisco, CA (US); James W. VanDyke, Sunnyvale, CA (US); Neal D. Evans, Sunnyvale, CA (US)

(72) Inventors: Darshan R. Kasar, San Francisco, CA (US); James W. VanDyke, Sunnyvale, CA (US); Neal D. Evans, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/160,431

(22) Filed: Jan. 28, 2021

Related U.S. Application Data

(60) Provisional application No. 62/984,848, filed on Mar. 4, 2020.

(51) Int. Cl.
 *G02B 27/01* (2006.01)
(52) U.S. Cl.
 CPC ..... *G02B 27/0176* (2013.01); *G02B 27/0172* (2013.01); *G02B 2027/0169* (2013.01)
(58) Field of Classification Search
 CPC .............. G02B 27/017; G02B 27/0172; G02B 27/0176
 See application file for complete search history.

(56) References Cited

U.S. PATENT DOCUMENTS

| | | | |
|---|---|---|---|
| 6,253,826 B1 * | 7/2001 | Witter | E06B 3/481 |
| | | | 160/213 |
| 6,484,322 B2 | 11/2002 | Christian | |
| 9,913,526 B2 | 3/2018 | Abreu | |
| 10,201,089 B2 | 2/2019 | Huitema et al. | |
| 10,289,163 B2 | 5/2019 | Huitema et al. | |
| 10,318,129 B2 | 6/2019 | Inagaki et al. | |
| 2007/0192933 A1 | 8/2007 | Kam | |
| 2011/0094015 A1 | 4/2011 | Braun et al. | |
| 2012/0304691 A1 | 12/2012 | Braun et al. | |
| 2016/0085278 A1 * | 3/2016 | Osterhout | G02B 27/017 |
| | | | 361/679.03 |
| 2017/0216099 A1 | 8/2017 | Saladino | |
| 2018/0197500 A1 * | 7/2018 | Patel | B65D 85/54 |
| 2019/0222913 A1 | 7/2019 | Leclerc et al. | |

* cited by examiner

*Primary Examiner* — Alexander Eisen
*Assistant Examiner* — Cory A Almeida
(74) *Attorney, Agent, or Firm* — Young Basile Hanlon & MacFarlane, P.C.

(57) ABSTRACT

A head-mounted device includes a housing assembly and a headband that is connected to the housing assembly and is movable between a use position and a storage position. The head-mounted device also includes a first magnetic component that is located on the headband and a second magnetic component that is located on the headband. The first magnetic component is spaced from the second magnetic component in the use position, and the first magnetic component and the second magnetic component are magnetically attracted to each other in the storage position.

22 Claims, 9 Drawing Sheets

# HEADBAND FOR HEAD-MOUNTED DEVICE WITH MAGNETIC COMPONENTS

CROSS-REFERENCE TO RELATED APPLICATIONS

This application claims the benefit of U.S. Provisional Application No. 62/984,848, filed on Mar. 4, 2020, the content of which is hereby incorporated by reference in its entirety for all purposes.

FIELD

The present disclosure relates generally to the field of head-mounted devices.

BACKGROUND

Head-mounted devices that display computer-generated reality content include display devices and optics that guide light from the display devices to a user's eyes. A support structure holds the device in place with respect to the user's head. Common support structure configurations include headbands with one strap that extends around the user's head, headbands with a first strap that extends around the user's head and a second strap that extends over the user's head, and rigid structures that a housing of the head-mounted device is suspended from, such as a "halo" type support structure.

SUMMARY

One aspect of the disclosure is a head-mounted device that includes a housing assembly and a headband that is connected to the housing assembly and is movable between a use position and a storage position. The head-mounted device also includes a first magnetic component that is located on the headband and a second magnetic component that is located on the headband. The first magnetic component is spaced from the second magnetic component in the use position, and the first magnetic component and the second magnetic component are magnetically attracted to each other in the storage position.

Magnetic attraction of the first magnetic component and the second magnetic component may define a first folded portion of the headband in the storage position. The first folded portion of the headband may be located between the first magnetic component and the second magnetic component. The head-mounted device may also include a third magnetic component that is located on the headband, wherein the third magnetic component is spaced from the second magnetic component in the use position, and the third magnetic component and the second magnetic component are magnetically attracted to each other in the storage position. Magnetic attraction of the second magnetic component and the third magnetic component may define a second folded portion of the headband in the storage position.

In some implementations of the head-mounted device, the headband includes a first lateral end and a lateral midpoint, wherein the headband is connected to the housing assembly at the first lateral end of the headband, and the first magnetic component and the second magnetic component are located between the first lateral end of the headband and the lateral midpoint of the headband.

In some implementations of the head-mounted device, the first magnetic component is part of a loudspeaker that is connected to the headband.

In some implementations of the head-mounted device, an external component is connectable to the second magnetic component. The external component may be a camera. The external component may be a battery pack.

The head-mounted device may include display components that are connected to the housing assembly to display content and optical components that are associated with the display components to allow a user to view the displayed content.

Another aspect of the disclosure is a head-mounted device that includes a housing assembly and a headband that is connected to the housing assembly and is movable between a use position and a storage position. A first magnetic component is located on the headband, and a second magnetic component is associated with the housing assembly. The first magnetic component is spaced from the housing assembly in the use position and the first magnetic component is urged toward the housing assembly in the storage position by magnetic attraction between the first magnetic component and the second magnetic component.

Magnetic attraction of the first magnetic component and the second magnetic component may cause engagement of the headband and the housing assembly in the storage position.

In some implementations of the head-mounted device, the second magnetic component is connected to the housing assembly. In some implementations of the head-mounted device, the housing assembly includes a facial interface, and the second magnetic component is located in the facial interface.

In some implementations of the head-mounted device, the headband has first lateral end, the headband has a second lateral end, the headband has a lateral midpoint, the headband is connected to the housing assembly at the first lateral end of the headband, the headband is connected to the housing assembly at the second lateral end of the headband, and the first magnetic component is located between the first lateral end of the headband and the lateral midpoint of the headband.

The head-mounted device may also include a third magnetic component that is located on the headband between the second lateral end of the headband and the lateral midpoint of the headband and a fourth magnetic component that is associated with the housing assembly, wherein the third magnetic component is spaced from the housing assembly in the use position and the third magnetic component is urged toward the housing assembly in the storage position by magnetic attraction between the third magnetic component and the fourth magnetic component.

In some implementations of the head-mounted device, the first magnetic component is part of a loudspeaker that is connected to the headband.

The head-mounted device may also include display components that are connected to the housing assembly to display content and optical components that are associated with the display components to allow a user to view the displayed content.

Another aspect of the disclosure is a head-mounted device that includes a housing assembly and a headband that is connected to the housing assembly and is movable between a use position and a storage position. The head-mounted device also includes a magnetic component that is connected to the headband and a sensor that is connected to the housing assembly and is configured to output a sensor signal that varies according to proximity of the magnetic component to the sensor. The magnetic component is moved toward the sensor when the headband is moved from the use position to the storage position.

In some implementations of the head-mounted device, the sensor signal that is output by the sensor changes in response to movement of the headband from the use position to the storage position so that comparison of the sensor signal to a threshold value indicates whether the headband is in the storage position or the use position.

In some implementations of the head-mounted device, the headband includes a first lateral end that is connected to the housing assembly and a second lateral end that is connected to the housing assembly, and a folded portion of the headband is defined when the headband is moved from the use position to the storage position.

In some implementations of the head-mounted device, the magnetic component is part of a loudspeaker that is connected to the headband.

The head-mounted device may also include display components that are connected to the housing assembly to display content; and optical components that are associated with the display components to allow the user to view the displayed content.

DETAILED DESCRIPTION

The disclosure herein relates to head-mounted devices that are used to show computer-generated reality (CGR) content to users using electronic display components and optical components. The head-mounted devices that are described herein included a headband that can be folded into a storage position and unfolded to a use position. Folding the headband into the storage position allows the head-mounted device to displace less volume when it is not in use. As an example, folding the headband into the storage position allows the head-mounted device to be neatly placed into a storage case that is smaller than it otherwise would be if the headband could not be folded. The headbands disclosed herein include features that help users to fold the headband in the correct way, so that the device can be stored compactly and/or placed in a storage case.

In some implementations, magnetic components are included in the headband to facilitate folding of the headband in a uniform and repeatable manner. In one example, first and second magnetic components are included in the headband at spaced locations along the headband. In the storage position, the first and second magnetic components are magnetically attracted to each other so that a fold is defined at a location along the length of the headband that is between the first and second magnetic components. In another example, a first magnetic component is located in the headband and a second magnetic component is located in the housing assembly of the head-mounted device. The first magnetic component in the headband is magnetically attracted to the second magnetic component in the housing assembly of the head-mounted device to place at least a portion of the headband in a desired position and orientation relative to the housing assembly.

In some implementations, sensors are used to detect the proximity of magnetic components in order to determine whether the headband is in the use position or in the storage position. In one example, a sensor is located in the housing assembly of the head-mounted device and a magnetic component is located in the headband of the head-mounted device. A sensor output signal from the sensor is evaluated to determine proximity of the magnetic component to the headband, and thereby determine whether the headband is in the use position or in the storage position.

In any of the implementations that are described herein, one or more of the magnetic components that are located on each lateral side of the headband may be part of a loudspeaker that is configured to produce sound so that it is heard by the user during display of a computer-generated reality scene to the user.

Figure 1:
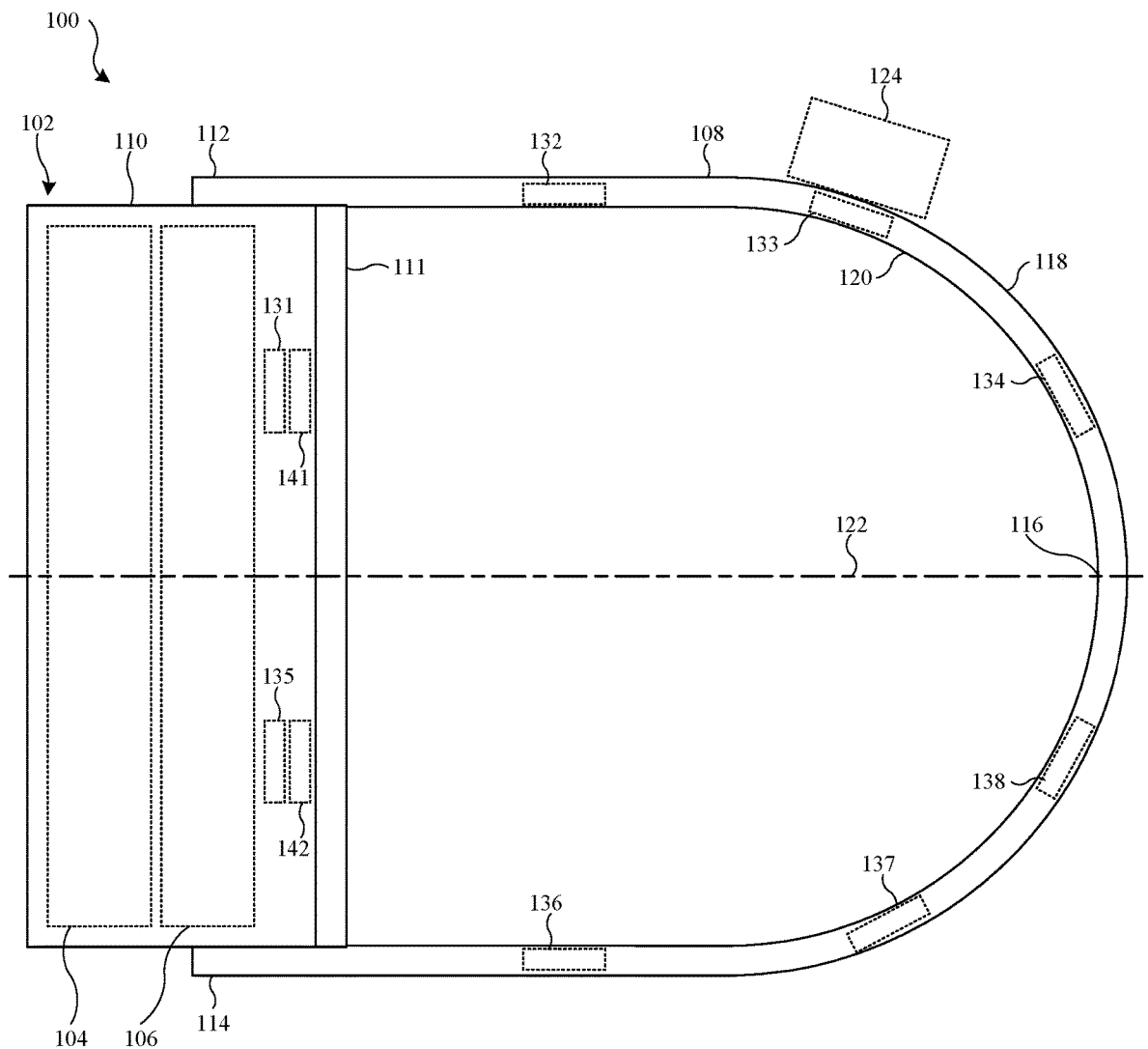
FIG. 1 is a top view illustration showing a head-mounted device in a use position.
Figure 2:
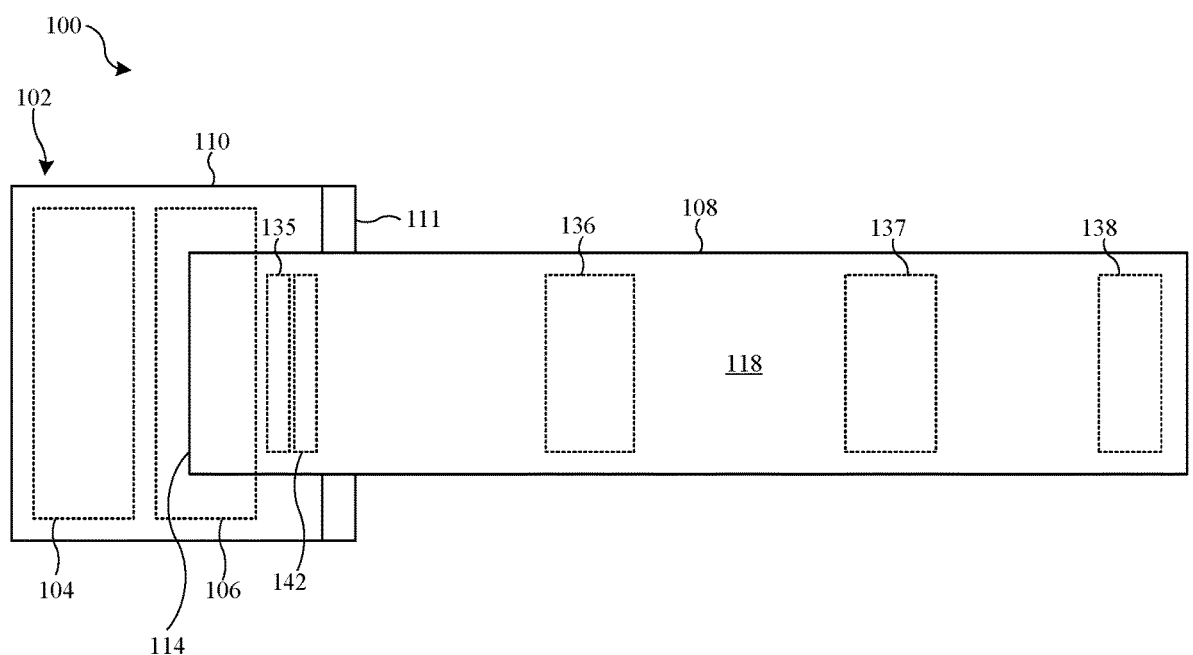
FIG. 2 is a side view illustration showing the head-mounted device of FIG. 1 in the use position.

FIG. 1 is a top view illustration showing a head-mounted device 100 in a use position, and FIG. 2 is a side view illustration showing the head-mounted device 100 in the use position.

The head-mounted device 100 is intended to be worn on the head of a user and includes components that are positioned near the user's eyes and are configured to display content to the user. Components that are included in the head-mounted device 100 may be configured to track motion of parts of the user's body, such as the user's head and hands. Motion tracking information that is obtained by components of the head-mounted device 100 can be utilized as inputs that control aspects of the generation and display of the content, so that the content displayed to the user can be part of a CGR experience in which the user is able to view and interact with virtual environments and virtual objects. CGR experiences include display of computer-generated content independent of the surrounding physical environment (e.g., virtual reality), and display of computer generated content that is overlaid relative to the surrounding physical environment (e.g., augmented reality). The CGR scene may be displayed to the user in accordance with a tracked position, orientation, and/or gaze angle for the head-mounted device. The content may be displayed to the user using stereo vision techniques, in which a different image is shown to each of the user's eyes, so that the content appears three-dimensional when viewed by the user. The configuration described herein for the head-mounted device 100 can be used to implement all head-mounted devices described herein.

The head-mounted device 100 includes a housing assembly 102, electronic components 104, optical components 106, and a headband 108.

The housing assembly 102 includes an enclosure 110 and a facial interface 111. The enclosure 110 is a structure that supports various other components that are included in the head-mounted device 100. The enclosure 110 may have a size and shape that corresponds generally to the width of an average person's head. The enclosure 110 may have a height that corresponds generally to the distance between an average person's forehead and cheek bones such that it extends above and below the average person's orbital cavities.

In one implementation, the enclosure 110 may be a frame that other components of the head-mounted device 100 are connected to. In some implementations, the enclosure 110 may be an enclosed structure such that certain components of the head-mounted device 100 are contained within the enclosure 110 and thereby protected from damage. As an example, part of or all of the electronic components 104 and the optical components 106 may be located inside the enclosure 110.

The facial interface 111 is connected to the enclosure 110 and is located at areas around a periphery of the enclosure 110 where contact with the user's face is likely. The facial interface 111 functions to engage portions of the user's face and to conform to portions of the user's face to allow the headband 108 to be tensioned to an extent that will restrain motion of the enclosure 110 with respect to the user's head. The facial interface 111 may be formed from a compressible and compliant material, such as open-cell foam rubber or closed cell foam rubber to allow for comfortable contact with the user's face.

When worn by the user, the facial interface 111 may contact areas of the user's face, such as the user's forehead, temples, and cheeks. As an example, an upper portion of the facial interface 111 may engage the user's forehead above the user's eyes, and a lower portion of the facial interface 111 may engage the user's cheeks below the user's eyes. In this way, the facial interface 111 may be adjacent to or extend around the user's eyes, which places the user's eyes adjacent to the enclosure 110 and, for example, near parts of the optical components 106, such as lenses.

In some implementations, the facial interface 111 may function to reduce the amount of light from the physical environment around the user that reaches the user's eyes by surrounding the user's eyes and substantially occupying a gap between the user's face and the enclosure 110. In some implementations, the facial interface 111 is not configured to limit the amount of ambient light that reaches the users eyes. For example, the facial interface 111 may include several discrete contact structures that are spaced from each other around the periphery of the enclosure 110. In some implementations, the facial interface 111 is omitted from the head-mounted device 100 in favor of other structures by which the enclosure 110 is supported with respect to the user's head and/or contacts the user's head.

The electronic components 104 of the head-mounted device 100 include components that cause content to be presented to the user by a light-emitting display device. An example implementation of the electronic components is described with reference to FIG. 14.

The optical components 106 direct the light emitted by the light-emitting display device toward the user's eyes. The optical components 106 are connected to the enclosure 110 of the housing assembly 102 such that portions of the optical components 106 (e.g., lenses) are positioned adjacent to the user's eyes. In some implementations, the optical components 106 may be configured isolate the emitted light from environment light (e.g., as in a virtual reality type system), so that a scene perceived by the user is defined only by the emitted light and not by the environment light. In some implementations, the optical components 106 may be configured to combine the emitted light with environmental light so that the scene perceived by the user is defined by the emitted light and the environment light. In some implementations, the optical components 106 may combine the emitted light and the environment light so that a spatial correspondence is established between the emitted light and the environmental light to define the scene that is perceived by the user (e.g., as in an augmented reality type system). The optical components 106 may include lenses, reflectors, polarizers, filters, optical combiners, and/or other optical components.

The headband 108 is a support structure that holds the head-mounted device 100 at a desired position and orientation relative to the user's head. The headband 108 is flexible structure that may include rigid or semi-rigid components. The headband 108 may be formed, in whole or in part, from an elastic material or from an inelastic material. As examples, the headband 108 may be formed, in part or in whole, from materials such as textile, plastic, or silicone. Although not shown in the illustrated example, the headband 108 may include tensioning structures and adjustment structures that passively or actively adjust the fit of the headband 108 relative to the user's head.

The headband 108 has a first lateral end 112, a second lateral end 114, a lateral midpoint 116, an outward-facing surface 118, and an inward-facing surface 120. The lateral midpoint 116 of the headband 108 is located approximately halfway between the first lateral end 112 and the second lateral end 114. In the illustrated example, the first lateral end 112 of the headband 108 is connected to a first lateral side of the enclosure 110, and the second lateral end 114 of the headband 108 is connected to a second lateral side of the enclosure 110. In the unfolded position, and when the headband 108 is not otherwise deformed, the lateral midpoint 116 of the headband 108 is approximately aligned with a lateral midline 122 of the enclosure 110, but deformation of the headband 108 in response to applied external forces can cause the position of the lateral midpoint 116 of the headband 108 to deviate from alignment with the lateral midline 122 of the enclosure 110.

The headband 108 that can be folded into a storage position and unfolded to a use position. Magnetic components and/or sensors are included in the headband 108 and/or in the housing assembly 102 to facilitate folding and/or to detect movement of the headband 108 between the storage position and the use position.

The magnetic components are structures that exhibit magnetic attraction with respect to one or more of the other magnetic components. At least some of the magnetic components include a magnet or multiple magnets (e.g., in an array) that serves as a source of a magnetic field to magnetically attract other magnets or ferromagnetic structures. Some of the magnetic components may be structures formed from ferromagnetic metals, which are attracted to the magnets that are included among the magnetic components.

As one example, a pair of the magnetic components may include a first magnetic component that includes one or more magnets and a second magnetic component that includes a ferromagnetic structure, so that the magnets of the first magnetic component are magnetically attracted to the ferromagnetic structure of the second magnetic component. As another example, a pair of the magnetic components may include a first magnetic component that includes one or more magnets and a second magnetic component that includes one or more magnets. In this example, the magnets that are included in each of the first magnetic component and the second magnetic component are arranged so that the magnets of the first magnetic component are magnetically attracted to the magnets of the second magnetic structure of the second magnetic component. This can be done by an alternating arrangement of magnetic poles, so that magnetic poles from the first magnetic component are arranged adjacent to oppositely-oriented magnetic poles from the second magnetic component.

The head-mounted device 100 may include a first group of magnetic components that are located on a first lateral side (e.g., a right lateral side) of the head-mounted device 100 and a second group of magnetic components that are located on a second lateral side (e.g., a left lateral side) of the head-mounted device 100. The first and second groups of magnetic components may be identical to each other to define symmetrical configurations on each side of the lateral midline of 122. Each of the first and second groups of magnetic components may include one or more magnetic components that are associated with the housing assembly 102 and one or more magnetic components that are associated with the headband 108. In the examples shown herein, the magnetic components from the first group of magnetic components do not interact with the magnetic components from the second group of magnetics components to define storage configurations for the head-mounted device 100.

In the illustrated example, the first group of magnetic components is located on the first lateral side of the head-mounted device 100 and includes a first magnetic component 131, a second magnetic component 132, a third magnetic component 133, and a fourth magnetic component 134.

The first magnetic component 131 is associated with the housing assembly 102 and is located between the lateral midline 122 and the first lateral side of the housing assembly 102. As one example, the first magnetic component 131 may be associated with the housing assembly 102 by being connected to the enclosure 110 of the housing assembly 102. As another example, the first magnetic component 131 may be associated with the housing assembly 102 by being connected to the facial interface 111 of the housing assembly 102, including location of the first magnetic component 131 behind the facial interface 111 or location of the first magnetic component 131 inside (e.g., embedded in) a foam structure of the facial interface 111.

The second magnetic component 132, the third magnetic component 133, and the fourth magnetic component 134 are associated with the headband 108 and are located between the first lateral end 112 of the headband 108 and the lateral midpoint 116 of the headband 108. As an example, the second magnetic component 132, the third magnetic component 133, and the fourth magnetic component 134 may be spaced along the length of the headband 108 between the first lateral end 112 of the headband 108 and the lateral midpoint 116 of the headband 108.

As one example, the second magnetic component 132, the third magnetic component 133, and the fourth magnetic component 134 may be associated with the headband 108 by connection to a surface of the headband 108, such as the outward-facing surface 118 of the headband 108 or the inward-facing surface 120 of the headband 108. A covering may be located on the second magnetic component 132, the third magnetic component 133, and/or the fourth magnetic component 134, such as a textile covering or a plastic covering. As another example, the second magnetic component 132, the third magnetic component 133, and the fourth magnetic component 134 may be associated with the headband 108 by being embedded in the headband 108.

In the illustrated example, the second group of magnetic components is located on the second lateral side of the head-mounted device 100 and includes a fifth magnetic component 135, a sixth magnetic component 136, a seventh magnetic component 137, and an eighth magnetic component 138.

The fifth magnetic component 135 is associated with the housing assembly 102 and is located between the lateral midline 122 and the second lateral side of the housing assembly 102. The fifth magnetic component 135 is otherwise consistent with the description of the first magnetic component 131.

The sixth magnetic component 136, the seventh magnetic component 137, and the eighth magnetic component 138 are associated with the headband 108 and are located between the second lateral end 114 of the headband 108 and the lateral midpoint 116 of the headband 108. The sixth magnetic component 136, the seventh magnetic component 137, and the eighth magnetic component 138 are otherwise consistent with the description of the second magnetic component 132, the third magnetic component 133, and the fourth magnetic component 134.

A first sensor 141 is associated with the housing assembly 102 (e.g., inclusive of the enclosure 110 and/or the facial interface 111) and is located between the lateral midline 122 of the housing assembly 102 and the first lateral side of the housing assembly 102. The first sensor 141 is configured to sense proximity of one or more of the magnetic components from the first group of magnetic components. The first sensor 141 can be implemented using any manner of sensing device that is able to detect proximity of a magnet or other magnetic component. In some implementations, the first sensor 141 may be a Hall effect sensor that is able to sense proximity of a magnet. As an example, the first sensor 141 may be configured to detect proximity of the second magnetic component 132 to the housing assembly 102 inclusive of the enclosure 110 and/or the facial interface 111. Thus, the first sensor 141 may output a signal that represents proximity of one of the second magnetic component 132, the third magnetic component 133, or the fourth magnetic component 134. This signal may be compared to threshold value to determine a position of one of the magnetic components with respect to the first sensor 141, for example, by determining that the magnetic component is adjacent to the first sensor 141 when the signal is above a threshold value and by determining that the magnetic component is spaced from the first sensor 141 when the signal is below the threshold value.

A second sensor 142 is associated with the housing assembly 102 (e.g., inclusive of the enclosure 110 and/or the facial interface 111) and is located between the lateral midline 122 of the housing assembly 102 and the first lateral side of the housing assembly 102. The second sensor 142 is configured to sense proximity of one or more of the magnetic components from the second group of magnetic components. Implementation and operation of the second sensor 142 is otherwise consistent with the description of the first sensor 141.

The use position and the storage position of the headband 108 will be described with respect to the first group of magnetic components. The second group of magnetic components operate identically in the use position and the storage position of the headband 108, and the description of the first group of magnetic components is applicable to the second group of magnetic components.

In the use position, which is depicted in FIGS. 1-2, the headband 108 of the head-mounted device 100 is shown in an unfolded position and is undeformed. In the illustrated example, this results in a generally u-shaped configuration for the headband 108 with the opposite ends of the headband (e.g., the first lateral end 112 and the second lateral end 114) being located at opposite lateral sides of the enclosure 110 of the housing assembly 102 of the head-mounted device. The generally u-shaped configuration of the headband 108 in the use position allows the user to place the head-mounted device 100 on their head with the headband 108 extending around their head to support the head-mounted device 100.

In the use position, the first through fourth magnetic components 131-134 of the first group of magnetic components are spaced from one another. The spacing between the first through fourth magnetic components 131-134 in the use position is large enough to prevent magnetic attraction between pairs of the first through fourth magnetic components 131-134 from causing the headband 108 to fold.

Figure 3:
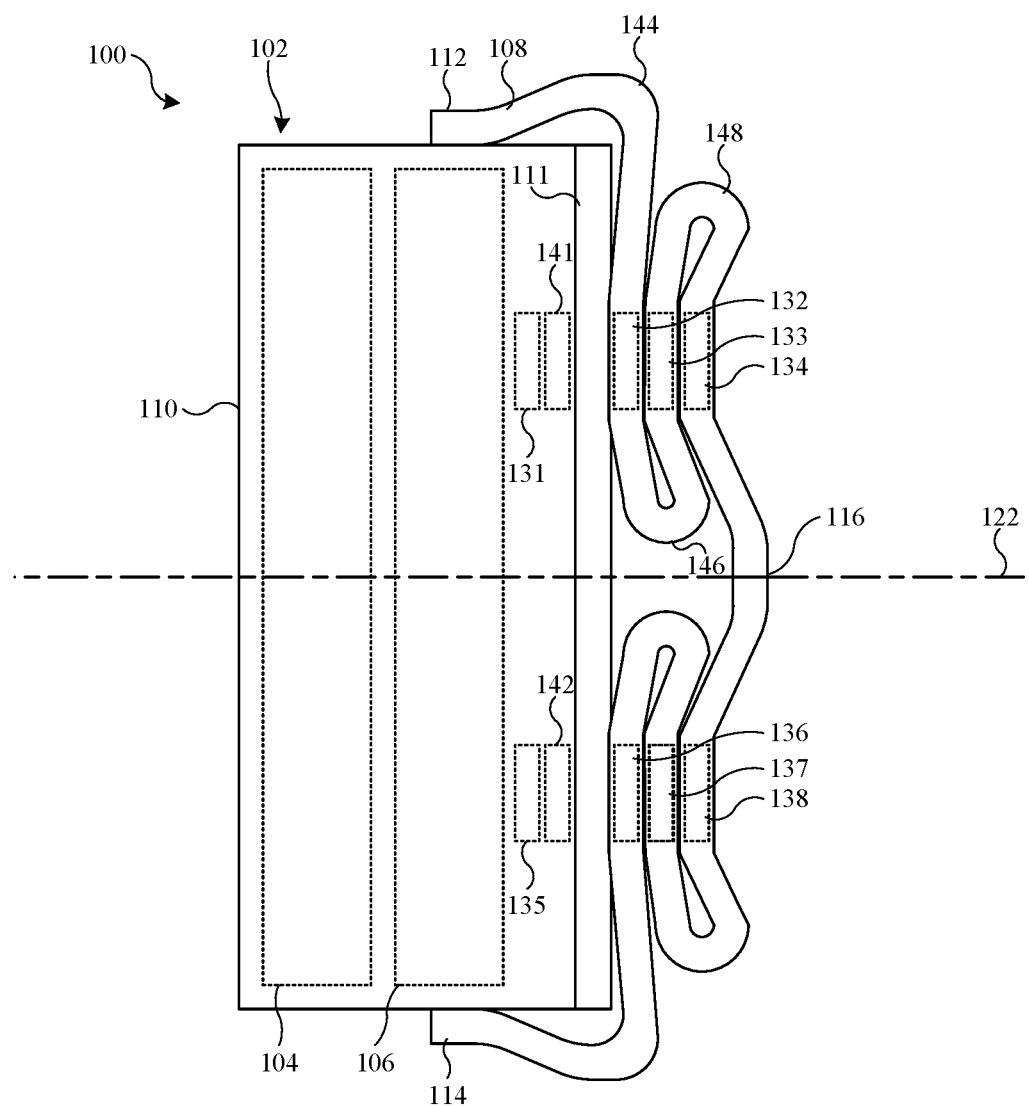
FIG. 3 is a top view illustration showing the head-mounted device of FIG. 1 in a storage position.

FIG. 3 is a top view illustration that shows the head-mounted device 100 in the storage position. The user of the head-mounted device 100 may fold the headband 108 manually to move the head-mounted device 100 from the use position to the storage position. As the user folds the headband 108, adjacent pairs of the first through fourth magnetic components 131-134 are magnetically attracted to each other. Magnetic attraction between adjacent pairs of the first through fourth magnetic components 131-134 components causes the headband 108 to fold into a predetermined configuration in which adjacent pairs of the first through fourth magnetic components 131-134 components cause portions of the headband 108 to align with one another. Thus, the first through fourth magnetic components 131-134 can facilitate orderly folding of the headband 108 into the predetermined configuration, so that, for example, the headband 108 may be stored in a storage case (not shown).

Magnetic attraction between adjacent pairs of the magnetic components defines folded portions of the headband 108 between adjacent pairs of the first through fourth magnetic components 131-134. Each of the folded portions of the headband 108 may be substantially u-shaped. Each of the folded portions of the headband 108 may define a one-hundred and eighty degree fold by which a first part of the headband 108 is caused to lie adjacent to a second part of the headband 108.

As one example, magnetic attraction between the first magnetic component 131 and the second magnetic component 132 may define a first folded portion 144 of the headband 108 that is located between the first lateral end 112 of the headband 108 and the second magnetic component 132. As another example, magnetic attraction between the second magnetic component 132 and the third magnetic component 133 may define a second folded portion 146 of the headband 108 that is located between the second magnetic component 132 and the third magnetic component 133. As another example, magnetic attraction between the third magnetic component 133 and the fourth magnetic component 134 may define a third folded portion 148 of the headband 108 that is located between the third magnetic component 133 and the fourth magnetic component 134.

When the headband 108 is in the storage position, it may be returned to the use position by the user. To do so, the user manually manipulates the headband 108 to separate the magnetic components from one another so that the magnetic components are again spaced apart and not magnetically attracted to one another.

When the headband 108 is in the storage position, the first sensor 141 may be used to determine whether the headband 108 has been folded correctly. As previously described, the output signal of the first sensor 141 may vary in accordance with proximity of the second magnetic component with respect to the first sensor 141. As an example, the output signal of the first sensor 141 maybe compared to a predetermined range when the headband 108 is in the storage position. The predetermined range is selected so that the sensor output signal from the first sensor 141 be within the predetermined range when the headband 108 has been folded correctly and so that the output signal from the first sensor 141 will not be within the predetermined range when the headband 108 has been folded incorrectly. The second sensor 142 may be used in a similar manner to confirm that the headband 108 has been folded correctly based on the sensor output signal from the second sensor 142, which varies in accordance with proximity of the sixth magnetic component 136 with respect to the second sensor 142.

Some or all of the magnetic components may have functions in addition to headband folding and sensing. For example, any of the magnetic components on the headband 108 can be used to mount an external component 124 to the headband 108, as shown in FIG. 1. As one example, the external component 124 may be a camera. As another example, the external component 124 may be a battery pack.

Figure 4:
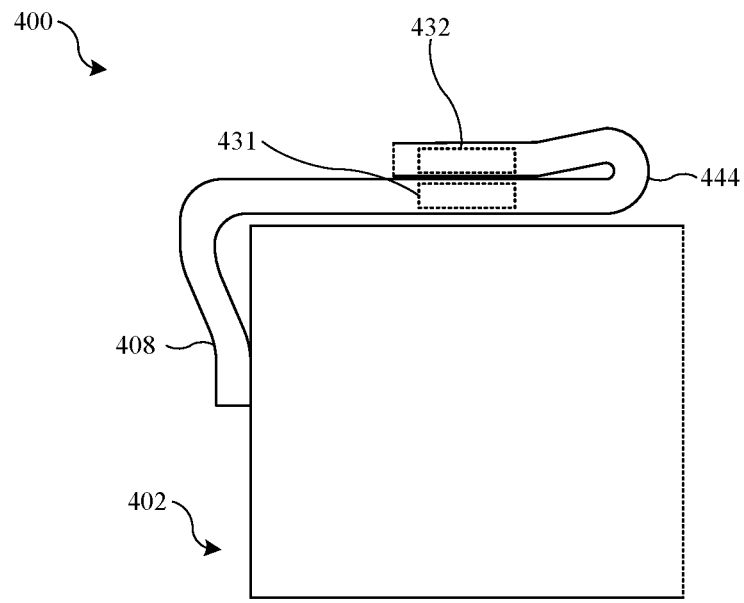
FIG. 4 is a top view detail illustration showing part of a head-mounted device according to a first alternative implementation in a storage position.

FIG. 4 is a top view detail illustration showing part of a head-mounted device 400 according to a first alternative implementation in a storage position. The description of the head-mounted device 100 and all of its components is applicable to the head-mounted device 400 except that the number and configuration of magnetic components and sensors has been modified as described herein. This description is made with respect to a first lateral side of the head-mounted device 400, and an equivalent configuration may be used on the second lateral side of the head-mounted device 400.

The head-mounted device 400 includes a housing assembly 402 and a headband 408 that is connected to the housing assembly and is movable between a use position (as in FIGS. 1-2) and a storage position. A first magnetic component 431 is located on the headband 408, and a second magnetic component 432. is located on the headband 408. The first magnetic component 431 is spaced from the second magnetic component 432 in the use position. The first magnetic component 431 and the second magnetic component 432 are magnetically attracted to each other in the storage position. The magnetic attraction of the first magnetic component 431 and the second magnetic component 432 defines a first folded portion 444 of the headband 408 in the storage position. The first folded portion 444 of the headband 408 is located between the first magnetic component 431 and the second magnetic component 432.

Figure 5:
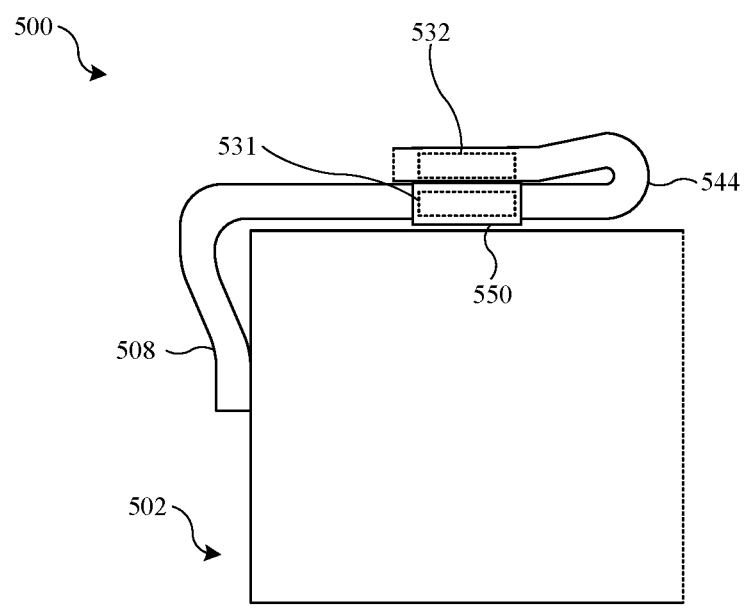
FIG. 5 is a top view detail illustration showing part of a head-mounted device according to a second alternative implementation in a storage position.

FIG. 5 is a top view detail illustration showing part of a head-mounted device 500 according to a second alternative implementation in a storage position. The head-mounted device 500 is consistent with the head-mounted device 400, and similarly includes a housing assembly 502, a headband 508, a first magnetic component 531, and a second magnetic component 532 that defines a first folded portion 544 of the headband 508 in the storage position. In the head-mounted device 500, the first magnetic component 531 is part of a loudspeaker 550 that is connected to the headband 508 and is operable to output audio content including, for example, audio content that is output by the head-mounted device 500 as part of a CGR scene.

Figure 6:
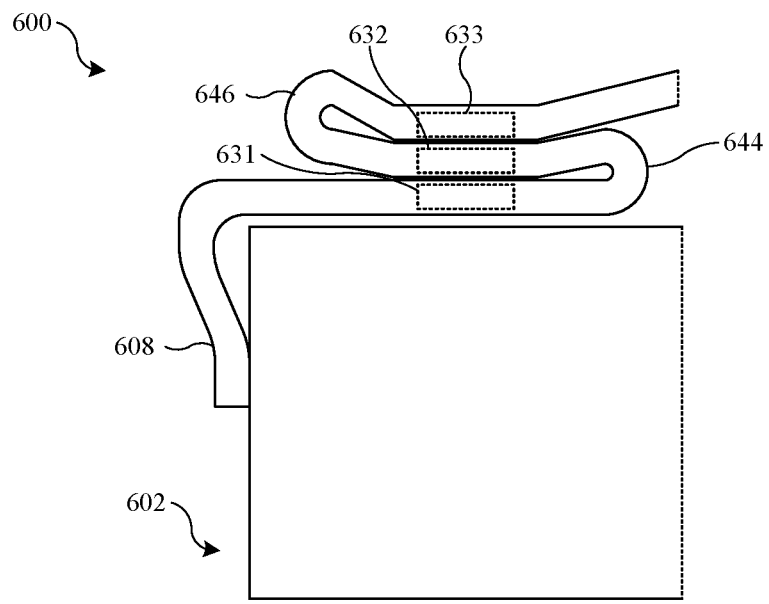
FIG. 6 is a top view detail illustration showing part of a head-mounted device according to a third alternative implementation in a storage position.

FIG. 6 is a top view detail illustration showing part of a head-mounted device 600 according to a third alternative implementation in a storage position. The description of the head-mounted device 100 and all of its components is applicable to the head-mounted device 600 except that the number and configuration of magnetic components and sensors has been modified as described herein. This description is made with respect to a first lateral side of the head-mounted device 600, and an equivalent configuration may be used on the second lateral side of the head-mounted device 600.

The head-mounted device 600 includes a housing assembly 602 and a headband 608 that is connected to the housing assembly 602 and is movable between a use position (as in FIGS. 1-2) and a storage position. A first magnetic component 631 is located on the headband 608, and a second magnetic component 632 is located on the headband 608. The first magnetic component 631, the second magnetic component 632, and the third magnetic component are spaced apart along the headband 608 in the use position. The first magnetic component 631, the second magnetic component 632, and the third magnetic component 633 are magnetically attracted to each other in the storage position. The magnetic attraction of the first magnetic component 631 and the second magnetic component 632 defines a first folded portion 644 of the headband 608 between the first magnetic component 631 and the second magnetic component 632 in the storage position. The magnetic attraction of the second magnetic component 632 and the third magnetic component 633 defines a second folded portion 646 of the headband 608 between the second magnetic component 632 and the third magnetic component 633 in the storage position.

Figure 7:
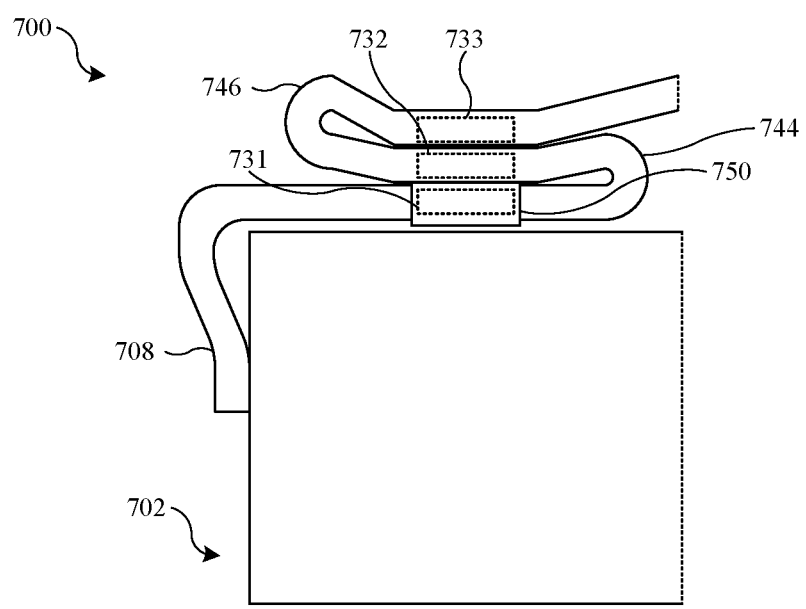
FIG. 7 is a top view detail illustration showing part of a head-mounted device according to a fourth alternative implementation in a storage position.

FIG. 7 is a top view detail illustration showing part of a head-mounted device 700 according to a fourth alternative implementation in a storage position. The head-mounted device 700 is consistent with the head-mounted device 600, and similarly includes a housing assembly 702, a headband 708, a first magnetic component 731, a second magnetic component 732, and a third magnetic component 733 that define a first folded portion 744 and a second folded portion 746 of the headband 708 in the storage position. In the head-mounted device 700, the first magnetic component 731 is part of a loudspeaker 750 that is connected to the headband 708 and is operable to output audio content including, for example, audio content that is output by the head-mounted device 700 as part of a CGR scene.

Figure 8:
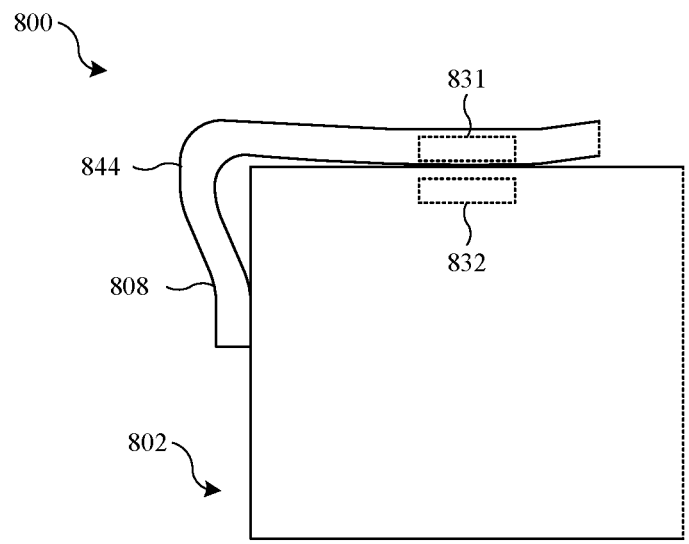
FIG. 8 is a top view detail illustration showing part of a head-mounted device according to a fifth alternative implementation in a storage position.

FIG. 8 is a top view detail illustration showing part of a head-mounted device 800 according to a fifth alternative implementation in a storage position. The description of the head-mounted device 100 and all of its components is applicable to the head-mounted device 800 except that the number and configuration of magnetic components and sensors has been modified as described herein. This description is made with respect to a first lateral side of the head-mounted device 800, and an equivalent configuration may be used on the second lateral side of the head-mounted device 800.

The head-mounted device 800 includes a housing assembly 802 and a headband 808 that is connected to the housing assembly 802 and is movable between a use position (as in FIGS. 1-2) and a storage position. A first magnetic component 831 is located on the headband 808 and a second magnetic component 832 is associated with the housing assembly 802. The first magnetic component 831 is spaced from the housing assembly 802 in the use position and the first magnetic component 831 is urged toward the housing assembly 802 in the storage position by magnetic attraction between the first magnetic component 831 and the second magnetic component 832. Magnetic attraction of the first magnetic component 831 and the second magnetic component 832 may cause engagement of the headband 808 and the housing assembly 802 in the storage position. Magnetic attraction of the first magnetic component 831 and the second magnetic component 832 may cause the headband 808 to define a first folded portion 844 between the first magnetic component and a lateral endpoint of the headband 808 where the headband 808 connects to the housing assembly 802.

The second magnetic component 832 may be connected to the housing assembly 802. The housing assembly 802 may include a facial interface (e.g., as explained with respect to the facial interface 111 of FIG. 1), and the second magnetic component 832 may be located in the facial interface.

Figure 9:
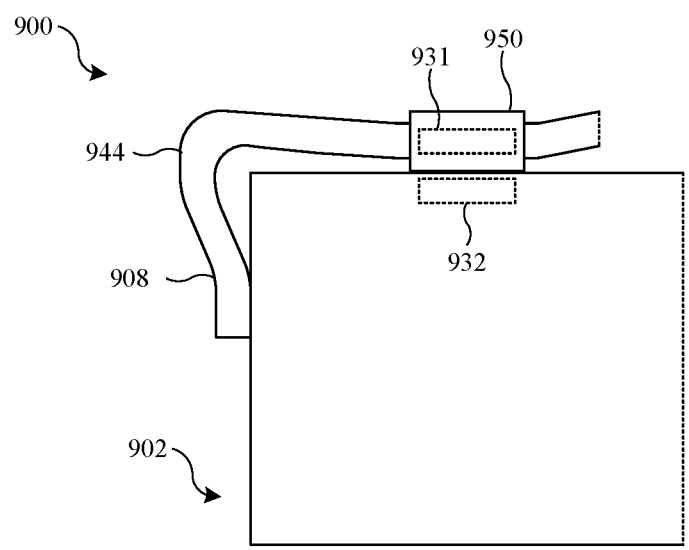
FIG. 9 is a top view detail illustration showing part of a head-mounted device according to a sixth alternative implementation in a storage position.

FIG. 9 is a top view detail illustration showing part of a head-mounted device 900 according to a sixth alternative implementation in a storage position. The head-mounted device 900 is consistent with the head-mounted device 800, and similarly includes a housing assembly 902, a headband 908, a first magnetic component 931, a second magnetic component 932, and a first folded portion 944 that is defined by the headband 908 in the storage position. In the head-mounted device 900, the first magnetic component 931 is part of a loudspeaker 950 that is connected to the headband 908 and is operable to output audio content including, for example, audio content that is output by the head-mounted device 900 as part of a CGR scene.

Figure 10:
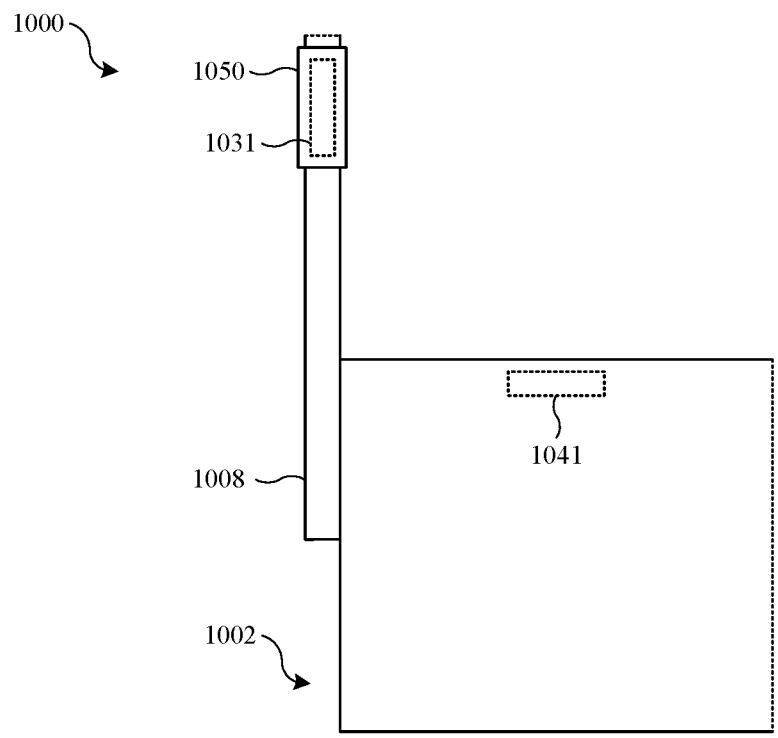
FIG. 10 is a top view detail illustration showing part of a head-mounted device according to a seventh alternative implementation in a use position.
Figure 11:
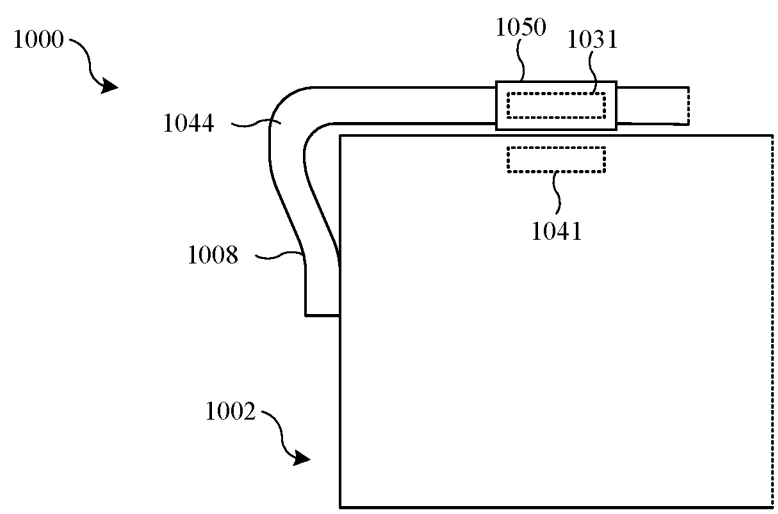
FIG. 11 is a is a top view detail illustration showing the head-mounted device of FIG. 10 in a storage position.
Figure 12:
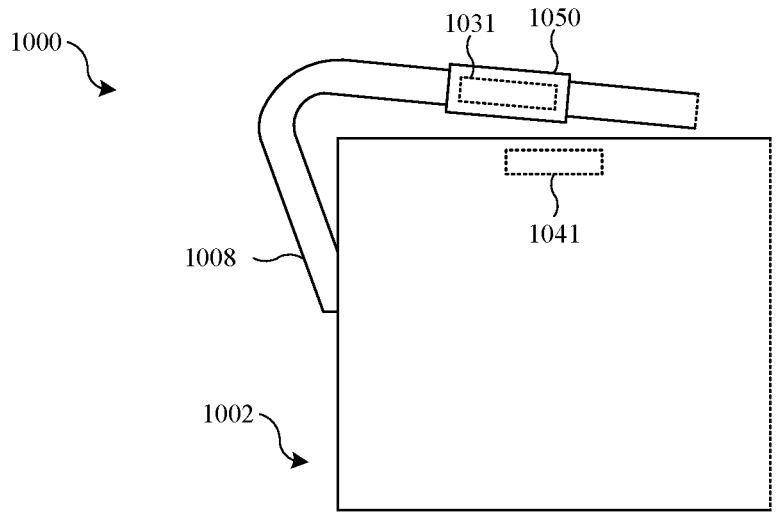
FIG. 12 is a is a top view detail illustration showing the head-mounted device of FIG. 10 in a misaligned storage position.

FIG. 10 is a top view detail illustration showing part of a head-mounted device 1000 according to a seventh alternative implementation in a use position. FIG. 11 is a is a top view detail illustration showing the head-mounted device 1000 in a storage position. FIG. 12 is a is a top view detail illustration showing the head-mounted device 1000 in a misaligned storage position. The description of the head-mounted device 100 and all of its components is applicable to the head-mounted device 1000 except that the number and configuration of magnetic components and sensors has been modified as described herein. This description is made with respect to a first lateral side of the head-mounted device 1000, and an equivalent configuration may be used on the second lateral side of the head-mounted device 1000.

The head-mounted device 1000 includes a housing assembly 1002 and a headband 1008 that is connected to the housing assembly 1002 and is movable between a use position and a storage position. A loudspeaker 1050 is connected to the headband 1008. The loudspeaker 1050 includes a magnetic component 1031, which is one of the elements of the loudspeaker 1050 that is involved in generating sound (e.g., by magnetic attraction in opposition to an electromagnetic coil that causes vibration of a cone) according to conventional loudspeaker design. A sensor 1041 is connected to the housing assembly 1002 and is configured to output a sensor signal that varies according to proximity of the magnetic component 1031 to the sensor 1041. Implementation, function, and operation of the sensor 1041 is consistent with the description of the first sensor 141.

The user may move the head-mounted device 1000 between the use position (FIG. 10) and the storage position (FIG. 11) by folding the headband 1008 relative to the housing assembly 1002. This may include defining a folded portion 1044 of the headband 1008 between the loudspeaker and the lateral end of the headband 1008 where it is connected to the housing assembly 1002. Additional folded portions of the headband 1008 may be defined as described with respect to the headband 108 of the head-mounted device 100. The magnetic component 1031 of the loudspeaker 1050 is moved toward the sensor 1041 when the headband 1008 is moved from the use position to the storage position.

When the user moves the headband 1008 from the use position to the storage position, the sensor output signal from the sensor 1041 changes. The sensor output signal may be interpreted to determine the position of the headband 1008. For example, the signal may be interpreted using electronic components of the head-mounted device 1000, according to the description of the electronic components 104 of the head-mounted device 100. For example, by comparison of the sensor output signal to one or more thresholds, it can be determined whether the headband 1008 is in the use position, in the storage position, or in the misaligned storage position (FIG. 12), which corresponds to incorrect folding of the headband 1008. As an example, a magnitude of the signal output by the sensor 1041 may be raised relative to the use position but lower than expected for the storage position when the headband 1008 is in the misaligned storage position. Various aspects of operation of the head-mounted device 1000 can be controlled based on this determination, as described previously and further herein. For example, the head-mounted device 1000 can output an alert to the user (e.g., an audible alert) if the misaligned storage position is detected.

Figure 13:
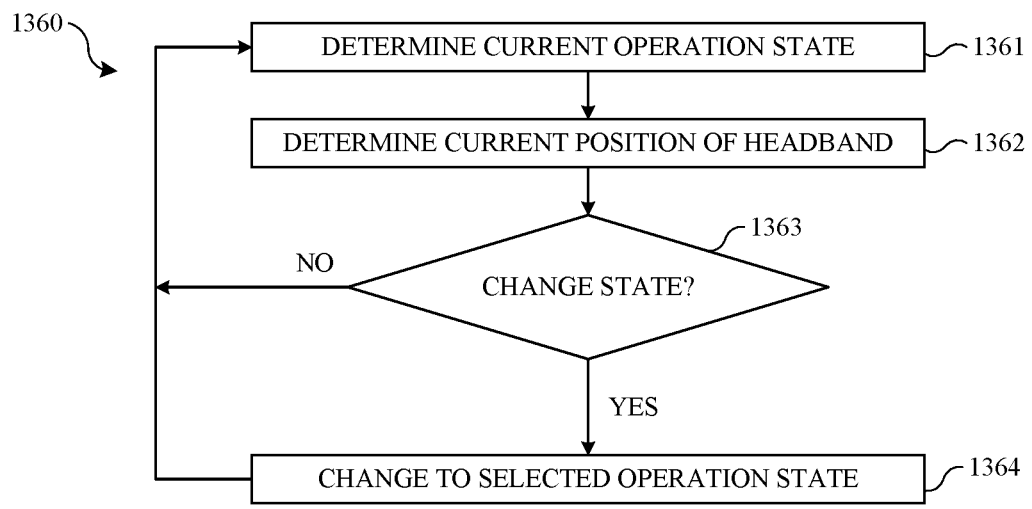
FIG. 13 is a flowchart that shows an example of a process for changing an operation state of a head-mounted device according to an example.

FIG. 13 is a flowchart that shows a process 1360 for changing an operation state of a head-mounted device. The process 1360 may be implemented using the head-mounted device 100 and its included components or other examples of head-mounted devices that are described herein. For example, the process 1360 may be implemented in the form of computer-executable program instructions that are stored in a memory and that perform the operations of the process 1360 when they are executed by a processor that is associated with the head-mounted device 100.

In the process 1360, the first sensor 141 and the second sensor 142 may be used to change an operation state of the head-mounted device 100. Operation states for the head-mounted device 100 represent different configurations for operation of and power consumption by various components of the head-mounted device 100, and are intended to allow power conservation when the head-mounted device 100 is not being used. Separate operation states may be established for short term disuse of the head-mounted device 100 and long term disuse of the head-mounted device 100. Examples of operation states for the head-mounted device 100 may include a normal operation state, a low power operation state, and a powered down operation state. The normal operation state corresponds to highest level of power consumption, the low power operation state corresponds to a lower level of power consumption than the normal operation state, and the powered down operation state corresponds to a lower level of power consumption than the low power operation state.

The normal operation state corresponds to active use of the head-mounted device 100. All systems may be powered on normally when in the normal operation state, so that content may be displayed to the user.

The low power operation state may be entered when the head-mounted device 100 has been removed from the user's head or after a time period has passed since the head-mounted device 100 has been removed. Removal of the head-mounted device 100 from the user's head can be determined, for example, using sensor outputs from photosensors or other devices associated with the head-mounted device 100.

In the low power operation state, one or more components of the head-mounted device 100 may be turned off to conserve energy. For example, a light emitting display panel of the head-mounted device 100 may be turned off so that it is not emitting light in the low power operation state. The head-mounted device 100 may be configured to quickly change between the normal operation state and the low power operation state. As one example, processor operation and memory states may be maintained in the low power operation state to allow quick return to the normal operation state. As another example, processor operation may be suspended in the low power operation state and memory states may be buffered to allow quick return to the normal operation state.

In the powered down operation state, the processor and memory of the head-mounted device 100 may be turned off. As an example, operating system software of head-mounted device 100 may need to conduct a boot operation to return to the normal operation safe from the power down operation state.

The powered down operation state can be entered by the head-mounted device 100 after a long period of disuse. For example, the powered down operation state can be entered after passage of a time period after entry into the low power operation state. There may be some power consumption by the head-mounted device 100 in the powered down operation state, or there may be no power consumption by the head-mounted device 100 in the powered down operation state.

In operation 1361 of the process 1360, a current operation state of the head-mounted device 100 is determined. According to the previous examples, the current operation state of the head-mounted device 100 may include a normal operation state, a low-power operation state, and a powered down operation state. Other operation states are possible. As previously described, the head-mounted device 100 may determine whether the headband is in the use position or the storage position based on the sensor output signals from sensors that detect proximity of magnetic components, such as the first sensor 141 and the second sensor 142.

In operation 1362, a current position of the headband 108 the head-mounted device 100 is determined. As examples, the current position of the headband 108 may be the use position or the storage position, as previously described. In some implementations, a time value may be recorded, for example, by storing the time value in memory, to allow changes in the operation state of the head-mounted device 100 to be performed in response to passage of a time period after a change in the operation state of the head-mounted device 100.

In operation 1363, a determination is made as to whether to change the operation state of the head-mounted device 100. As one example, the operation state of the head-mounted device 100 can be changed when the position of the headband 108 of the head-mounted device 100 is changed.

As another example, the operation state of the head-mounted device 100 can be changed after passage of a time period has elapsed since the position of the headband 108 of the head-mounted device 100 was changed. The determination made in operation 1363 includes selecting an operation state to change to, and this state may be referred to as a selected operation state.

In response to determining that the headband 108 has moved from the use position to the storage position, the operation state of the head-mounted device 100 may be changed from a current operation state to a different operation state in which the head-mounted device 100 consumes less power. As one example, the operation state of the head-mounted device 100 may be changed from the normal operation state to the low power operation state in response to determining that the headband 108 has been moved from the use position to the storage position. As another example, the operation state of the head-mounted device 100 may be changed from the lower power operation state to the powered down operation state in response to determining that the headband 108 has been moved from the use position to the storage position. As another example, the operation state of the head-mounted device 100 may be changed from the normal operation state to the low power operation state in response to determining that a predetermined time period has passed since the headband was moved from the use position to the storage position. As another example, the operation state of the head-mounted device 100 may be changed from the low power operation state to the power down operation state in response to determining that a predetermined time period has passed since the headband was moved from the use position to the storage position. As another example, the operation state of the head-mounted device 100 maybe change from the low power operation state to these powered down operation state in response to determining that the predetermined period of time has passed since entering the low power operation state.

In response to determining that the headband 108 has moved from the storage position to the use position, the current operation state of the head-mounted device 100 can be changed from the current operation state to the normal operation state.

If the operation state is to be changed, based on the determination in operation 1363, the process proceeds to operation 1364 where the operation state is changed to the selected operation state. The process then returns to operation 1361. If the operation state is not to be changed, based on the determination in operation 1363, the process returns to operation 1361.

Figure 14:
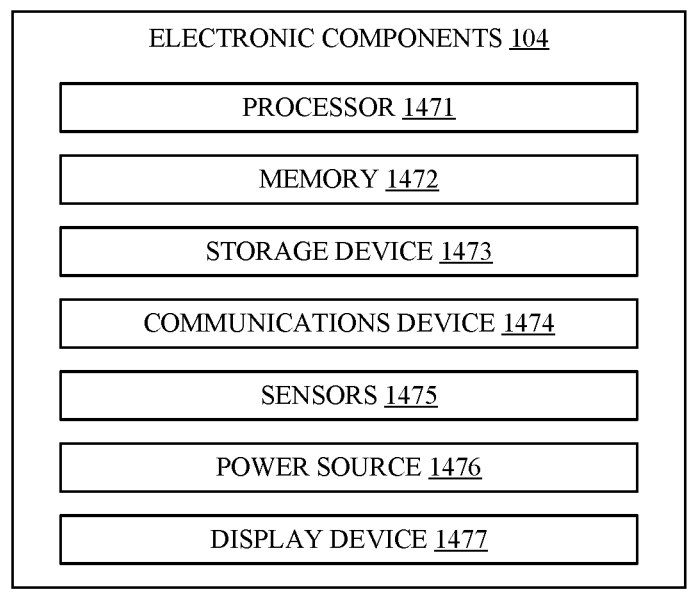
FIG. 14 is a block diagram that shows an example of a hardware configuration for electronic components of a head-mounted device.

FIG. 14 is a block diagram that shows an example of a hardware configuration for the electronic components 104 of the head-mounted device 100.

The processor 1471 is a device that is operable to execute computer program instructions and is operable to perform operations that are described by the computer program instructions. The processor 1471 may be implemented using one or more conventional devices and/or more or more special-purpose devices. As examples, the processor 1471 may be implemented using one or more central processing units, one or more graphics processing units, one or more application specific integrated circuits, and/or one or more field programmable gate arrays. The processor 1471 may be provided with computer-executable instructions that cause the processor 1471 to perform specific functions. The memory 1472 may be one or more volatile, high-speed, short-term information storage devices such as random-access memory modules.

The storage device 1473 is intended to allow for long term storage of computer program instructions and other data. Examples of suitable devices for use as the storage device 1473 include non-volatile information storage devices of various types, such as a flash memory module, a hard drive, or a solid-state drive.

The communications device 1474 supports wired or wireless communications with other devices. Any suitable wired or wireless communications protocol may be used.

The sensors 1475 are components that are incorporated in the head-mounted device 100 to generate sensor output signals to are used as inputs by the processor 1471 for use in generating CGR content and controlling tension, as will be described herein. The sensors 1475 include components that facilitate motion tracking (e.g., head tracking and optionally handheld controller tracking in six degrees of freedom). The sensors 1475 may also include additional sensors that are used by the device to generate and/or enhance the user's experience in any way. The sensors 1475 may include conventional components such as cameras, infrared cameras, infrared emitters, depth cameras, structured-light sensing devices, accelerometers, gyroscopes, and magnetometers. The sensors 1475 may also include biometric sensors that are operable to physical or physiological features of a person, for example, for use in user identification and authorization. Biometric sensors may include fingerprint scanners, retinal scanners, and face scanners (e.g., two-dimensional and three-dimensional scanning components operable to obtain image and/or three-dimensional surface representations). Other types of devices can be incorporated in the sensors 1475. The information that is generated by the sensors 1475 is provided to other components of the head-mounted device 100, such as the processor 1471, as inputs.

The power source 1476 supplies electrical power to components of the head-mounted device 100. In some implementations, the power source 1476 is a wired connection to electrical power. In some implementations, the power source 1476 may include a battery of any suitable type, such as a rechargeable battery. In implementations that include a battery, the head-mounted device 100 may include components that facilitate wired or wireless recharging.

The display device 1477 functions to display content to the user in the form of emitted light that is output by the display device 1477 and is directed toward the user's eyes by the optical components 106 of the head-mounted device 100. The display device 1477 is a light-emitting display device, such as a video display of any suitable type, that is able to output images in response to a signal that is received from the processor 1471. The display device 1477 may be of the type that selectively illuminates individual display elements according to a color and intensity in accordance with pixel values from an image. As examples, the display device may be implemented using a liquid-crystal display (LCD) device, a light-emitting diode (LED) display device, a liquid crystal on silicon (LCoS) display device, an organic light-emitting diode (OLED) display device, or any other suitable type of display device. The display device 1477 may include multiple individual display devices (e.g., two display screens or other display devices arranged side-by-side in correspondence to the user's left eye and the user's right eye).

In some implementations of the head-mounted device 100, some or all of these components may be included in a separate device that is removable. For example, any or all of the processor 1471, the memory 1472, and/or the storage device 1473, the communications device 1474, the sensors 1475, the power source 1476, and the display device 1477 may be incorporated in a device such as a smart phone that is connected (e.g., by docking) to the other portions of the head-mounted device 100.

In some implementations of the head-mounted device 100, the processor 1471, the memory 1472, and/or the storage device 1473 are omitted, and the corresponding functions are performed by an external device that communicates with the head-mounted device 100. In such an implementation, the head-mounted device 100 may include components that support a data transfer connection with the external device using a wired connection or a wireless connection that is established using the communications device 1474.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create three-dimensional or spatial audio environment that provides the perception of point audio sources in three-dimensional space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources for use during operation of a head-mounted device. As an example, such data may identify the user and include user-specific settings or preferences. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, a user profile may be established that stores fit and comfort related information that allows the head-mounted device to be actively adjusted for a user. Accordingly, use of such personal information data enhances the user's experience.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of storing a user profile to adjustment of a head-mounted device, the present technology can be configured to allow users to select to "opt in" or "opt out" of participation in the collection of personal information data during registration for services or anytime thereafter. In another example, users can select not to provide data regarding usage of specific applications. In yet another example, users can select to limit the length of time that application usage data is maintained or entirely prohibit the development of an application usage profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, fit and comfort related parameters may be determined each time the head-mounted device is used, such as by scanning a user's face as they place the device on their head, and without subsequently storing the information or associating with the particular user.

What is claimed is:

1. A head-mounted device, comprising:
    a housing assembly;
    a headband that is connected to the housing assembly and is movable between a use position and a storage position;
    a first magnetic component that is located on the headband; and
    a second magnetic component that is located on the headband,
    wherein the first magnetic component is spaced from the second magnetic component in the use position, and the first magnetic component and the second magnetic component are magnetically attracted to each other in the storage position.

2. The head-mounted device of claim 1, wherein magnetic attraction of the first magnetic component and the second magnetic component defines a first folded portion of the headband in the storage position.

3. The head-mounted device of claim 2, wherein the first folded portion of the headband is located between the first magnetic component and the second magnetic component.

4. The head-mounted device of claim 3, further comprising:
    a third magnetic component that is located on the headband, wherein the third magnetic component is spaced from the second magnetic component in the use position, and the third magnetic component and the second magnetic component are magnetically attracted to each other in the storage position.

5. The head-mounted device of claim 4, wherein magnetic attraction of the second magnetic component and the third magnetic component defines a second folded portion of the headband in the storage position.

6. The head-mounted device of claim 1, wherein the headband includes a first lateral end and a lateral midpoint, wherein the headband is connected to the housing assembly at the first lateral end of the headband, and the first magnetic component and the second magnetic component are located between the first lateral end of the headband and the lateral midpoint of the headband.

7. The head-mounted device of claim 1, wherein the first magnetic component is part of a loudspeaker that is connected to the headband.

8. The head-mounted device of claim 1, wherein an external component is connectable to the second magnetic component.

9. The head-mounted device of claim 1, further comprising:
    display components that are connected to the housing assembly to display content; and
    optical components that are associated with the display components to allow a user to view the displayed content.

10. A head-mounted device, comprising:
    a housing assembly;
    a headband that is connected to the housing assembly and is movable between a use position and a storage position;
    a first magnetic component that is located on the headband; and
    a second magnetic component that is associated with the housing assembly,
    wherein the first magnetic component is spaced from the housing assembly in the use position and the first magnetic component is urged toward the housing assembly in the storage position by magnetic attraction between the first magnetic component and the second magnetic component.

11. The head-mounted device of claim 10, wherein magnetic attraction of the first magnetic component and the second magnetic component causes engagement of the headband and the housing assembly in the storage position.

12. The head-mounted device of claim 10, wherein the second magnetic component is connected to the housing assembly.

13. The head-mounted device of the claim 10, wherein the housing assembly includes a facial interface, and the second magnetic component is located in the facial interface.

14. The head-mounted device of claim 10, wherein the headband has a first lateral end, the headband has a second lateral end, the headband has a lateral midpoint, the headband is connected to the housing assembly at the first lateral end of the headband, the headband is connected to the housing assembly at the second lateral end of the headband, and the first magnetic component is located between the first lateral end of the headband and the lateral midpoint of the headband.

15. The head-mounted device of claim 14, further comprising:
    a third magnetic component that is located on the headband between the second lateral end of the headband and the lateral midpoint of the headband; and
    a fourth magnetic component that is associated with the housing assembly,
    wherein the third magnetic component is spaced from the housing assembly in the use position and the third magnetic component is urged toward the housing assembly in the storage position by magnetic attraction between the third magnetic component and the fourth magnetic component.

16. The head-mounted device of claim 10, wherein the first magnetic component is part of a loudspeaker that is connected to the headband.

17. The head-mounted device of claim 10, further comprising:
    display components that are connected to the housing assembly to display content; and
    optical components that are associated with the display components to allow a user to view the displayed content.

18. A head-mounted device, comprising:
    a housing assembly;
    a headband that is connected to the housing assembly and is movable between a use position and a storage position;
    a magnetic component that is connected to the headband; and
    a sensor that is connected to the housing assembly and is configured to output a sensor signal that varies according to proximity of the magnetic component to the sensor, wherein the magnetic component is moved toward the sensor when the headband is moved from the use position to the storage position and the sensor signal indicates whether the headband is in the use position, the storage position, or a misaligned storage position.

19. The head-mounted device of claim 18, wherein the sensor signal that is output by the sensor changes in response to movement of the headband from the use position to the storage position so that comparison of the sensor signal to a threshold value indicates whether the headband is in the storage position or the use position.

20. The head-mounted device of claim 18, wherein the headband includes a first lateral end that is connected to the housing assembly and a second lateral end that is connected to the housing assembly, and a folded portion of the headband is defined when the headband is moved from the use position to the storage position.

21. The head-mounted device of claim 18, wherein the magnetic component is part of a loudspeaker that is connected to the headband.

22. The head-mounted device of claim 18, further comprising:
   display components that are connected to the housing assembly to display content; and
   optical components that are associated with the display components to allow a user to view the displayed content.

* * * * *